US009225566B2

(12) United States Patent
Muppirisetty et al.

(10) Patent No.: US 9,225,566 B2
(45) Date of Patent: Dec. 29, 2015

(54) FREQUENCY OFFSET ESTIMATION IN COMMUNICATION DEVICES

(71) Applicant: ST-Ericsson SA, Plan-les-Ouates (CH)

(72) Inventors: Leela Srikar Muppirisetty, Machilipatnam Andhra Pradesh (IN); Aravindh Krishnamoorthy, Bangalore (IN)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/361,399

(22) PCT Filed: Dec. 10, 2012

(86) PCT No.: PCT/EP2012/074934
§ 371 (c)(1),
(2) Date: May 29, 2014

(87) PCT Pub. No.: WO2013/083833
PCT Pub. Date: Jun. 13, 2013

(65) Prior Publication Data
US 2014/0321526 A1    Oct. 30, 2014

Related U.S. Application Data

(60) Provisional application No. 61/599,551, filed on Feb. 16, 2012.

(30) Foreign Application Priority Data

Dec. 9, 2011    (IN) ............................ 3593/DEL/2011

(51) Int. Cl.
*H04L 27/00*    (2006.01)
(52) U.S. Cl.
CPC ..... *H04L 27/0014* (2013.01); *H04L 2027/0028* (2013.01); *H04L 2027/0042* (2013.01)

(58) Field of Classification Search
CPC ........... H04B 1/10; H04B 1/707; H04L 27/28
See application file for complete search history.

(56) References Cited

U.S. PATENT DOCUMENTS 7,725,090 B2    5/2010    Cheng et al.
2004/0013169 A1*    1/2004    Kanemoto et al. ............ 375/147
(Continued)

FOREIGN PATENT DOCUMENTS

WO    00/69198 A1    11/2000
WO    2010/058282 A1    5/2010

OTHER PUBLICATIONS

International Search Report issued in corresponding International application No. PCT/EP2012/074934, date of mailing May 23, 2013.
Written Opinion of the International Searching Authority issued in corresponding International application No. PCT/EP2012/074934, date of mailing May 23, 2013.

(Continued)

*Primary Examiner* — Jaison Joseph
(74) *Attorney, Agent, or Firm* — Patent Portfolio Builders PLLC (57) ABSTRACT

The present subject matter discloses a system and a method for estimating a frequency offset in communication devices. In one embodiment, the method of estimating a frequency offset in a communication device comprises generating a reconstructed signal based at least in part on a channel impulse response (CIR) corresponding to a received signal. Further, a normalization matrix is determined for the reconstructed signal. Thereafter, based at least in part on the normalization matrix and the reconstructed signal, the frequency offset is estimated such that the frequency offset corresponds to a maximum normalized-correlation between the reconstructed signal and the received signal.

24 Claims, 7 Drawing Sheets

(56) References Cited

U.S. PATENT DOCUMENTS

| | | | |
|---|---|---|---|
| 2005/0135512 A1* | 6/2005 | Zhuang et al. | 375/344 |
| 2006/0233153 A1* | 10/2006 | Cheng et al. | 370/350 |
| 2009/0274222 A1* | 11/2009 | Morelli et al. | 375/260 |
| 2012/0082274 A1* | 4/2012 | Bury | 375/346 |
| 2013/0016767 A1* | 1/2013 | Pean et al. | 375/232 |

OTHER PUBLICATIONS

Meyr, Heinrich., et al., "Digital Communication Receivers—Synchronization, Channel Estimation and Signal Processing," Digital Communication Receivers: Synchronization, Channel Estimation, and Signal Processing; Wiley Series in Telecommunications and Signal Processing, John Wiley and Sons, New York, pp. 445-504, XP002548562, ISBN: 978-0-471-50275-3, Jan. 1, 1988.

* cited by examiner

FREQUENCY OFFSET ESTIMATION IN COMMUNICATION DEVICES

TECHNICAL FIELD

The present subject matter relates, in general, to communication systems and, in particular, to estimation of frequency offset in communication devices.

BACKGROUND OF THE SUBJECT MATTER

In a communication system, signals are transmitted between a transmission unit of a fixed base station and a communication device, such as cellular phones, personal digital assistants, and portable computers. The signals travel over a physical medium, usually referred to as a channel, and are received by a receiver unit of the communication device, or the fixed base station. A conventional method of recovering, from a received signal, an estimated signal that is substantially similar to the originally transmitted signal involves down-converting the received signal to obtain data symbols. The data symbols thus obtained, typically estimate the data symbols transmitted in the originally transmitted signal. Down-converting the received signal typically involves mixing the received signal with a reference signal corresponding to the carrier frequency of the transmitted signal, for example, a local carrier signal to generate a baseband or intermediate frequency (IF) signal for further processing by the receiver.

However, frequency variations introduced by the channel, for example, due to Doppler spread and various receiver components, such as filters and oscillators, may result in a frequency offset between the carrier frequency of the received signal and the reference signal, used by the receiver unit. Frequency variations thus introduced may affect the estimation of the originally transmitted signal. Further, the frequency offset may also affect computation of various channel coefficients, also referred to as channel impulse response (CIR), which are typically used for equalizing the received signal. The frequency offset may thus result in degradation of the performance of the receiver unit.

Conventionally, various techniques have been deployed in communication devices, to estimate the frequency offset. One such conventional technique, disclosed in U.S. Pat. No. 7,725,090, includes estimating the frequency offset using phase shift undergone by the received signal estimated from the received signal at the receiver. In said technique, initially a reference signal x(n) is generated using the following equation:

$$x(n) = \text{conj}(r(n)) \cdot \tilde{r}(n)$$

where n=1, ..., 2N samples, r(n) is a received signal; $\tilde{r}(n)$ is a reconstructed signal, i.e., a signal reconstructed to generate a signal similar to r(n); * denotes an element-wise multiply operation; and conj(.) denotes a conjugate operation. The reference signal x(n) may then be used to obtain, for 2N samples, a phase offset "theta", denoting the phase rotation undergone by the IF signal using the following equation:

$$\text{theta} = 1/N\{\text{mean}[x(N+1:2N)^* \text{conj}(x(1:N))]\}$$

where mean(.) denotes an arithmetic mean operation. The phase offset "theta" may then be used to estimate the frequency offset using the following equation:

$$f_{estimated} = \frac{\text{theta}}{2\pi T}$$

where T denotes a symbol cycle of the received signal.

The estimated frequency offset may then be used to correct frequency offset error in the received signal. This technique of frequency offset estimation, however, does not work effectively in wireless communication systems, for example, under fading and in interference scenarios. For instance, using the phase shift undergone by the received signal may affect the accuracy of the estimated frequency offset as the phase shift undergone by the received signal may not be uniform throughout. As will be known to a person skilled in the art, the phase shift may differ based on the phase change of the channel traversed by the transmitted signal. For example, when the channel phase changes slowly, the estimated frequency accordingly changes little; while when the channel phase changes rapidly, a phase jump may occur. This phase jump thus needs to be taken into consideration when using frequency estimation to conduct frequency offset correction. The estimated frequency offset may thus need to be adjusted or averaged before being used for frequency offset correction, which may increase the expense and time required for correcting the frequency offset.

Another conventional technique, disclosed in patent publication no. WO 2010/058282, employs an iterative, blind, frequency-offset estimation process that exploits temporal (block) correlation of the received signal to estimate the frequency offset. The technique involves forming a temporally and/or spatially stacked signal block from multi-branch signal samples corresponding to each of two or more time-separated samples of the received signal. The temporally stacked signal block is then used for computing a maximum-likelihood joint estimate of the receiver frequency offset and the temporal/spatial covariance of the temporally stacked signal block de-rotated by the receiver frequency. Initially, temporally and/or spatially stacked signal blocks are formed for r[n], i.e., a received signal and r[n, α], i.e., a received signal vector de-rotated by a frequency offset α as follows:

$$r_M[n] = \text{vec}([r_C[n], r_C[n-1], \ldots r_C[n-M]]) \text{ and}$$

$$r_M[n,\alpha] = \text{vec}([r_C[n,\alpha], r_C[n-1,\alpha], \ldots r_C[n-M,\alpha]])$$

where M denotes a model order, $r_M[n]$ is a vector formed by stacking received signals $\{r_C[k]\}_{k=n-M}^{n}$ in columns, and $r_M[n, \alpha]$ is a vector formed by stacking de-rotated received signals $\{r[k, \alpha]\}_{k=n-M}^{n}$ in columns.

An estimate of a signal covariance matrix Q is then computed based on the de-rotated received signal block as follows:

$$\hat{Q}(\alpha) \equiv \underset{Q}{\text{argmin}} \; 11(\alpha, Q) = \frac{1}{N-M} \sum_{n=M}^{N-1} r_M[n, \alpha] r_M[n, \alpha]^H$$

where ll(α, Q) is a log-likelihood function of α and Q.

Further, an estimate of the receiver frequency offset α is computed based on the received signal block as follows:

$$\hat{\alpha}(Q) \cong \frac{\langle r_M[n], X_M[n] \rangle_{Q^{-1}}}{\langle X_M[n], Z_M[n] \rangle_{Q^{-1}}}$$

where $$X_M[n] = j \left\{ \begin{bmatrix} n-n_0 & 0 & \cdots & 0 \\ 0 & n-1-n_0 & \ddots & \vdots \\ \vdots & \ddots & \ddots & 0 \\ 0 & \cdots & 0 & n-M-n_0 \end{bmatrix} \otimes I_{N_r} \right\} r_M[n];$$

$$Z_M[n] = \left\{ \begin{bmatrix} n-n_0 & 0 & \cdots & 0 \\ 0 & n-1-n_0 & \ddots & \vdots \\ \vdots & \ddots & \ddots & 0 \\ 0 & \cdots & 0 & n-M-n_0 \end{bmatrix}^2 \otimes I_{N_r} \right\} r_M[n];$$

$I_{N_T}$ denotes an identity matrix, and $\otimes$ denotes the Kronecker product.

$\hat{Q}(\alpha)$ and $\hat{\alpha}(Q)$ may then be used in an iterative manner to compute an approximate maximum-likelihood estimate of the frequency offset. The technique, however, is not useful in estimating frequency offset for transmission signals having certain statistical properties, for example, circular Gaussian nature like certain classes of voice services over adaptive multi-user channels on one slot (VAMOS) signals when Sub-Channel Power imbalance ratio (SCPIR) is equal to 0 dB. As will be known, for circular Gaussian signals statistical properties of the signal do not change upon rotation. The above technique, being based on rotation undergone by the signal, is thus not able to estimate the frequency offset in such signals. For instance, in the VAMOS signals when SCPIR is equal to 0 dB, the statistical properties of the VAMOS signals may remain unchanged with respect to frequency offset due to which the above technique may fail to estimate any frequency offset, irrespective of the frequency offset introduced by the channel.

SUMMARY

This summary is provided to introduce concepts related to a method and a system for estimating a frequency offset in communication devices. The concepts are further described below in the detailed description. This summary is not intended to identify essential features of the claimed subject matter nor is it intended for use in determining or limiting the scope of the claimed subject matter.

In a first aspect, the method of estimating a frequency offset in a communication device comprises generating a reconstructed signal based at least in part on a channel impulse response (CIR) corresponding to a received signal. The method further comprises determining a normalization matrix for the reconstructed signal. Further, the frequency offset is estimated, based at least in part on the normalization matrix and the reconstructed signal, such that the frequency offset corresponds to a maximum normalized-correlation between the reconstructed signal and the received signal.

Additionally, in one embodiment, the frequency offset may be estimated based also on the received signal.

In a second aspect, the subject matter concerns a computer program product comprising a computer readable medium, having thereon a computer program comprising program instructions. Further, the computer program is loadable into a data-processing unit and adapted to cause execution of the method according to the first aspect of the subject matter.

In a third aspect, the subject matter concerns a device configured to estimate frequency offset according to the first aspect of the subject matter.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components. For simplicity and clarity of illustration, elements in the figures are not necessarily to scale. Some embodiments of devices and/or methods in accordance with embodiments of the present subject matter are now described, by way of example only, and with reference to the accompanying figures, in which.

DETAILED DESCRIPTION

Systems and methods for estimating frequency offset in a communication device are described herein. The systems and methods can be implemented in a variety of communication devices. The communication devices that can implement the described method(s) include, but are not limited to, fixed telephones, hand-held devices, laptops or other portable computers, mobile phones, personal digital assistants (PDAs), global positioning system (GPS) tracking devices and the like. Additionally, the method can be implemented in any communication network, such as Global System for Mobile Communication (GSM) network, Enhanced Data rates for GSM Evolution (EDGE) network, Universal Mobile Telecommunications System (UMTS) network, Personal Communications Service (PCS) network, Time Division Multiple Access (TDMA) network, Code Division Multiple Access (CDMA) network, Next Generation Network (NGN), and IP-based network, Public Switched Telephone Network (PSTN), Integrated Services Digital Network (ISDN), Long Term Evolution (LTE) network, and satellite communication network. In general, the systems and methods may be implemented in any network where frequency offset may be experienced and/or in any communication device.

Embodiments of the invention may be particularly beneficial in systems applying circular Gaussian signals, for which the conventional techniques fail to estimate the frequency offset. For example, for certain classes of 3GPP voice services over adaptive multi-user channels on one slot (VAMOS) signals the conventional techniques fail when Sub-Channel Power imbalance ratio (SCPIR) of the VAMOS signals is equal to 0 dB. The present invention may be similarly useful for Gaussian minimum shift keying (GMSK) signals for which the conventional techniques fail for certain interference conditions, for example, due to orthogonal interferers. Additionally, the present subject may be used in almost all communication networks, for example, for noise-dominated signals where the noise in I/Q branches of the signal are independent of each other. Although the description herein is with reference to certain communication networks, the systems and methods may be implemented in other communication networks and devices, albeit with a few variations, as will be understood by a person skilled in the art.

Typically, in a communication network, the data is transmitted, in the form of transmitted signals, by one or more transmitters of the communication network. The transmitted signals traverse through a channel and are received, as received signals, by a receiver unit of a communication device. However, the transmitted signal, while traversing in the channel, is adversely affected by various channel impairments, such as noise, interferences, multipath propagation, and frequency variations, for example, due to Doppler spread. As would be well known to those skilled in the art, noise in the channel is typically caused due to distortions while interferences are typically caused, for example, by operation of other communication devices. Multipath propagation occurs when the transmitted signals travel through multiple paths of propagation to reach the communication device while Doppler spread is typically caused due to movement of the communication devices in relation to each other and the surroundings.

Further, the received signals are also adversely affected by frequency variations caused due to operation of the various components, such as filters and oscillators implemented for signal processing at the receiver unit. Hence the received signals are seldom identical to the transmitted signals. Distortion of the transmitted signals is regarded as a characteristic property of the channel. Typically, the channel is assumed to be behaving as a filter, which causes said distortions in the transmitted signals. Usually, the receiver unit is configured to recover, from a received signal, an estimated signal that is substantially similar to the originally transmitted signal. However, frequency variations introduced by the channel and various components of the receiver unit result in a frequency offset between the carrier frequency of the received signal and a reference signal used by the receiver unit to recover the estimated signal, thus affecting the estimation of the originally transmitted signal. The frequency offset affects the proper reception and demodulation of the received signals. Thus, the receiver unit typically estimates and compensates the frequency offset using appropriate frequency offset correction or adjustment methods.

The present subject matter discloses a system and a method of estimating frequency offset of a receiver unit in a communication device. Data transmitted in the form of a transmitted signal, by one or more transmitters, such as a transmission unit of a fixed base station or a communication device, such as a cellular phone, a personal digital assistant, or a portable computer is received, as a received signal, by a receiver of the communication device, or the fixed base station, respectively. Although the description herein is with reference to a downlink of a transmissions system, the systems and methods may be implemented in an uplink of the transmission system, albeit with a few variations, as will be understood by a person skilled in the art.

The transmitted signal propagates over a physical medium, usually referred to as a channel, to reach the communication device. The received signal is subsequently processed to estimate a channel impulse response (CIR) of the channel. The CIR may be understood as channel coefficients that help in estimating the characteristics of the channel, when the channel is considered as a filter. Estimating the characteristics of the channel helps to undo the distortions caused by the channel and recover an estimated signal, which is substantially similar to the originally received signals. The CIR, as will be known to a person skilled in the art, may be estimated using various methods that have not been explained here for the sake of brevity. For example, the CIR may be estimated using a training sequence present in the received signal. The training sequence, as will be apparent to a person skilled in the art, may be provided in the transmitted signal and may be used as a timing reference and for equalization of the received signal.

The CIR thus estimated is used for determining equalized symbols corresponding to the received signal. The equalized symbols may be understood as the symbols or known information obtained by equalizing data derived from the received signal. The equalized symbols are subsequently demodulated to obtain demodulated symbols.

A reconstructed signal is subsequently generated based, in one implementation, on the demodulated symbols and the CIR. The reconstructed signal is generated for the received signal as a convolution of the demodulated symbols and the CIR. Further, when a single transmitted signal is received by multiple antennas connected to the communication device, or when multiple received signals are obtained from a single antenna by oversampling, each such multiple received signal may be represented as a branch of a multi-branch signal. In such a case, a reconstructed signal branch may be generated corresponding to each signal branch, with the reconstructed signal branch being generated as a convolution of the demodulated symbols and the CIR corresponding to the signal branch for which the reconstructed signal branch is generated. The reconstructed signal for the received signal in such a case may be generated as a reconstruction matrix of a plurality of reconstructed signal branches, where the plurality of reconstructed signal branch comprises the reconstructed signal branches generated for each branch of the received signal. Although, the description here is explained with reference to reconstruction based on the demodulated symbols and the CIR, the signal could be reconstructed using the CIR and other known information or symbols, albeit with a few variations, as will be understood by a person skilled in the art. For instance, in one implementation, the equalized symbols may be used with the CIR to generate the reconstructed signal. In another implementation, the training sequence or other known symbols, such as pilot signals may be used with the CIR for generation of the reconstructed signal.

The reconstructed signal and the received signal are then used to estimate a frequency offset $\alpha$ of the received signal. In one embodiment, a maximum normalized-correlation may be computed for the reconstructed signal and the received signal having the frequency offset $\alpha$. In order to compute the maximum normalized-correlation initially a normalization matrix, such as a covariance matrix or a whitening filter is determined. In one embodiment, the normalization matrix is determined based on the reconstructed signal. In another embodiment, the normalization matrix may be a pre-computed matrix, for example, an identity matrix. The maximum normalized-correlation for the reconstructed signal and the received signal having the frequency offset $\alpha$ is then computed using the normalization matrix. The frequency offset corresponding to the maximum normalized-correlation may then be estimated as the frequency offset $\alpha$.

In one embodiment, frequency offset $\alpha$ may be estimated based on an approximation of a modeled received signal as a Taylor expansion having the frequency offset $\alpha$ as argument. The modeled received signal may be considered as a signal modeled from the received signal. In another embodiment, the received signal may be initially rotated using a set of predetermined hypothetical frequency offsets to calculate, for each of the predetermined hypothetical frequency offsets, a normalized-correlation between the reconstructed signal and the rotated signal. The predetermined hypothetical frequency offset that yields the maximum normalized-correlation may then be selected as the frequency offset $\alpha$.

The frequency offset $\alpha$ thus computed may be provided to a frequency correction module configured to correct the frequency offset using appropriate frequency offset correction or adjustment methods.

The system and the method of the present subject matter thus facilitate the correction of the frequency offset in a communication device by estimating the frequency offset using the technique of maximization of the normalized-correlation of the received signal and the reconstructed signal. Using the technique of maximization of the normalized-correlation allows the system and the method to be efficiently used in wireless communicating devices as the technique normalizes the effect of fading and interference on the transmitted signal in the channel. Further, utilizing maximization of the normalized-correlation of the received signal and the reconstructed signal ensures that the estimation of the frequency offset is not based on rotation undergone by the transmitted signal. The present technique may thus be effectively used for frequency estimation of circular Gaussian signals, such as VAMOS signals for which the conventional techniques fail at certain conditions, for example, when SCPIR is equal to 0 dB for the VAMOS signals. These and other advantages would be described in greater detail in conjunction with the following figures.

It should be noted that the description and the figures merely illustrate the principles of the present subject matter. It will thus be appreciated that those skilled in the art will be able to devise various arrangements that, although not explicitly described or shown herein, embody the principles of the present subject matter and are included within its spirit and scope. Moreover, all statements herein reciting principles, aspects, and embodiments of the present subject matter, as well as specific examples thereof, are intended to encompass equivalents thereof.

It will be appreciated by those skilled in the art that the words during, while, and when as used herein are not exact terms that mean an action takes place instantly upon an initiating action but that there may be some small but reasonable delay, such as a propagation delay, between the initial action, and the reaction that is initiated by the initial action. Additionally, the word "connected" is used throughout for clarity of the description and can include either a direct connection or an indirect connection. The descriptions and details of well-known components are omitted for simplicity of the description.

Figure 1:
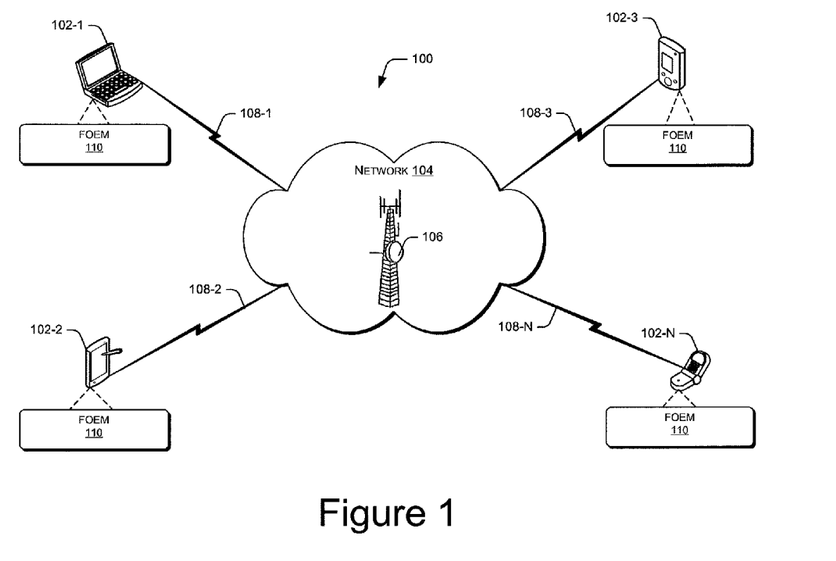
FIG. 1 illustrates an exemplary communication network environment, according to an embodiment of the present subject matter.

FIG. 1 illustrates a network environment 100 implementing one or more communication devices 102 configured to estimate frequency offset, according to an embodiment of the present subject matter. In one implementation, the network environment 100 includes one or more communication devices 102-1, 102-2, 102-3, . . . , 102-N (collectively referred to as communication devices 102) communicating with each other through a network 104. The communication devices 102 may include, without limitation, hand-held devices, laptops, tablets or other portable computers, smart phones, mobile phones, global positioning system (GPS) receivers, personal digital assistants (PDAs), and the like. Each of the communication devices 102 works on a communication protocol as defined by the network 104 to which the communication device 102 is coupled.

The network 104 may be a wireless or a wired network, or a combination thereof. The network 104 can be a collection of individual networks, interconnected with each other and functioning as a single large network. Examples of such individual networks include, but are not limited to, GSM network, Enhanced Data rates for GSM Evolution (EDGE) network, UMTS network, PCS network, TDMA network, CDMA network, NGN, IP-based network, PSTN, ISDN, LTE, and satellite communication. Depending on the technology, the network 104 includes various network entities, such as base stations, mobile switching centers, transmission towers, gateways, routers; as would be apparent to a person skilled in the art, and such details have been omitted for brevity. In one implementation, the network 104 works on circular Gaussian signals, for example, certain classes of 3GPP voice services over adaptive multi-user channels on one slot (VAMOS) signals. Although the description herein is with reference to certain communication networks, the systems and methods may be implemented in other communication networks and devices, albeit with a few variations, as will be understood by a person skilled in the art.

In operation, originally transmitted signals, i.e., signals transmitted by a base transceiver station (BTS) 106 of the network 104 over a medium, usually referred to as a channel, such as air, are received by the communication devices 102 as received signals 108-1, 108-2, 108-3, . . . , 108-N, collectively referred to as the received signals 108. While traversing through the channel, the originally transmitted signals are subjected to various impairments leading to changes in its properties, such as phase, frequency, and amplitude. Impairments in the originally transmitted signals may be caused due to various factors, such as noise, interferences, multipath propagation, and frequency variations, for example, due to Doppler shift.

Noise in the channel may be due to various factors, such as distortions due to, for example, faulty electrical equipments. Conventionally, Additive White Gaussian Noise (AWGN) model is used to model background noise in a channel. In AWGN channel, the primary cause of distortion of originally transmitted signals is due to addition of wideband or white noise. Interferences are typically caused, for example, by operation of other communication devices in the path of signal propagation. Multipath propagation occurs when the originally transmitted signals travel through multiple paths of propagation to reach the communication device 102. For example, a first path may be the line of sight; a second path may be due to reflection at an obstacle such as a building; and so on. Doppler shift, as would be well known to those skilled in the art, is caused due to movement of the communication devices 102 or other objects in the network environment 100 leading to a change in path length between the BTS 106 and the communication devices 102 or between different communication devices.

Due the above stated impairments, the received signals 108 are seldom identical to the originally transmitted signals. The channel may thus be considered to be behaving as a filter causing the impairments in signal properties of the originally transmitted signals with distortion of the originally transmitted signals being regarded as a characteristic property of the channel. Further, the received signals 108 are also adversely affected by the noise and frequency variations caused due to operation of the various components, such as filters and oscillators, implemented for signal processing in the communication devices 102. The communication devices 102 are thus configured to estimate and correct the distortions in the received signal 108.

The communication devices 102 are configured to down-convert the received signal 108 in order to recover an estimated signal that is substantially similar to the original transmitted signal. For the purpose, the communication devices 102 initially mix the received signal 108 with a reference signal, also known as a local carrier signal to generate a baseband or intermediate frequency (IF) signal. However, frequency variations introduced by the channel and the various components result in a frequency offset $\alpha$ between a carrier frequency of the received signal 108 and the reference signal used by the communication devices 102. The communication devices 102 thus first estimate and then compensate the frequency offset $\alpha$ for improving performance of the communication devices 102.

In one embodiment, the communication devices 102 reconstruct a signal, which may be understood as an estimation of the received signal 108 without the frequency offset $\alpha$. The reconstructed signal is provided to a frequency offset estimation module (FOEM) 110 configured to estimate the frequency offset $\alpha$. The FOEM 110 uses the reconstructed signal and the received signal 108 to estimate the frequency offset $\alpha$. In one implementation, the FOEM 110 uses a technique of normalized-correlation to estimate the frequency offset $\alpha$. Normalized-correlation, as will be known to a person skilled in the art, can be used to determine similarity between two signals. The FOEM 110 thus uses the technique of normalized-correlation to estimate a value of the frequency offset $\alpha$.

Further, in order to achieve a high degree of accuracy in estimating frequency offset $\alpha$, the FOEM 110 computes a frequency offset corresponding to a maximum normalized-correlation for the received signal 108 and the reconstructed signal as the frequency offset $\alpha$. The FOEM 110 initially determines a normalization matrix, such as a covariance matrix based on the reconstructed signal. Alternatively, the FOEM 110 may use a pre-computed matrix, such as an identity matrix as the normalization matrix. The normalization matrix may then be used by the FOEM 110 to compute the maximum normalized-correlation for the reconstructed signal and the received signal 108 to estimate the frequency offset $\alpha$. In one embodiment, the FOEM 110 may estimate the frequency offset $\alpha$ using a hypothesis based approach. In said approach, the FOEM 110 selects, from a set of predetermined hypothetical frequency offsets, a predetermined hypothetical frequency offset that yields the maximum normalized-correlation between a rotated received signal and the reconstructed signal as the frequency offset $\alpha$. In another embodiment, the FOEM 110 may estimate the frequency offset $\alpha$ based on an approximation of a modeled received signal, i.e., a signal modeled from the received signal 108. In one implementation, the modeled received signal may be approximated as a Taylor expansion having the frequency offset $\alpha$ as argument.

The working of the FOEM 110 will be explained in greater detail with the relation to FIG. 2. The frequency offset $\alpha$ thus computed is then used to correct the frequency offset between the carrier frequency of the received signal 108 and the reference signal used by the communication devices 102.

Figure 2:
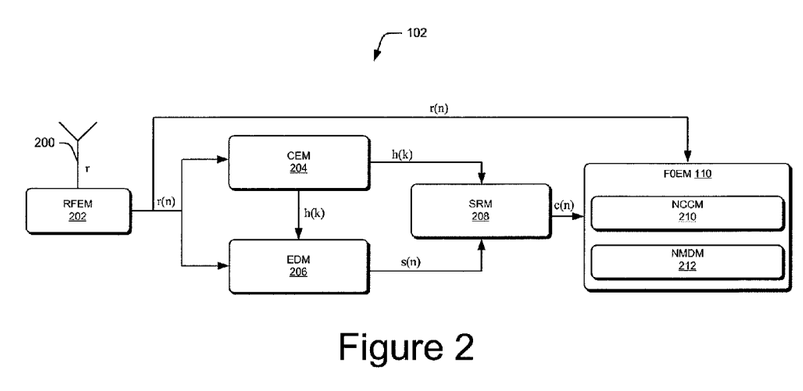
FIG. 2 illustrates a communication device implementing a system for frequency offset estimation, according to an embodiment of the present subject matter.

FIG. 2 illustrates components of the communication device 102 configured to estimate the frequency offset $\alpha$, in accordance with an embodiment of the present subject matter. The communication device 102 includes a processor (not shown in figure) and a memory (not shown in figure) coupled to the processor. The processor can be a single processing unit or a number of units, all of which could include multiple computing units. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions stored in the memory. The memory may include any computer-readable medium known in the art including, for example, volatile memory such as SRAMs and DRAMs and/or non-volatile memory such as EPROMs and flash memories. In one implementation, the memory includes modules and data.

The modules include routines, programs, objects, components, data structures, which perform particular tasks or implement particular abstract data types. The modules may also be implemented as, signal processor(s), state machines, logic circuitries, microprocessor(s), microcontroller(s), and/or any devices or components that manipulate signals based on operational instructions.

In one embodiment, the communication device 102 includes an antenna 200 connected to a receiver front-end module (RFEM) 202, a channel estimation module (CEM) 204, an equalization and demodulation module (EDM) 206, a signal reconstruction module (SRM) 208, and the FOEM 110. Further the communication device 102 may also include other module(s). The other module(s) may include programs or coded instructions, such as operating systems, that supplement applications and functions of the communication device 102. In one implementation, the RFEM 202, the CEM 204, the EDM 206, the SRM 208, and the FOEM 110 may be implemented in a receiver unit (not shown in the figure) of the communication device 102.

In said embodiment, the communication device 102 can include a data module which, amongst other things, serves as a repository for storing data processed, received, associated and generated by one or more modules. The data module also includes temporary information generated as a result of the execution of one or more modules.

In operation, the originally transmitted signal, transmitted over the channel, is received as the received signal 108, represented by (r) in the figure, by the communication device 102. As mentioned earlier, the received signal 108 and the originally transmitted signal are seldom identical. Hence, the communication device 102 is configured to recover an estimated signal, which is substantially identical to the originally transmitted signals, from the received signal 108. As will be known to a person skilled in the art, communication signals may be transmitted in the form of bursts, with each burst having N data bits. In one implementation, the received signal 108 is assumed to be received over a burst of N samples and may be represented as r(n) where n=0, 1, . . . , N−1. In such a case, received signal 108 may be represented as follows:

$$r(n) = \begin{bmatrix} r(0) \\ \vdots \\ r(N-1) \end{bmatrix}^T \quad (1)$$

where T refers to a transposition function.

Further, for multi-branch signals, the received signal 108 may be represented as a matrix of all the signal branches received by the communication device 102. Multi-branch signals, as will be understood by a person skilled in the art, are multiple branches of a single transmitted signal generated when the transmitted signals are received by multiple antennas. For example, in single input multiple output (SIMO) or multiple input multiple output (MIMO) receivers, the received signal 108 is received by multiple antennas connected to the communication device 102. Additionally, over sampling of a single received signal may also result in generation of the multi-branch signals. For instance, for an originally transmitted signal t(n), the received signal r(n) may be received by the communication device 102 as a multi-branch signal having m signal branches, with $r^1, r^2, \ldots, r^m$ being the received signals corresponding to each signal branch.

Further, in case of multi-branch signals, the received signal may be represented as a matrix having multiple rows, with one row corresponding to each received signal branch.

The received signal 108 is initially received by the antenna 200 and provided to the RFEM 202. Although, for the sake of simplicity only the antenna 200 is shown, one or more such antennas may be connected to the RFEM 202 to receive the received signal 108. The RFEM 202 is configured to downconvert the received signal 108 to generate the baseband signal. In one implementation, the RFEM 202 mixes the received signal 108 with a reference signal, for example, a local carrier signal generated by a Local Oscillator connected to the RFEM 202. A down-converted signal thus received is sampled using an Analog to Digital converter (not shown in the figure) provided in the RFEM 202 to obtain a digital received baseband signal r(n), hereinafter referred to as the received signal r(n). As will be obvious to a person skilled in the art, the received signal r(n) may contain the frequency offset α due to the local oscillator frequency mismatch and the Doppler shift. The received signal r(n) is subsequently fed to the CEM 204, the EDM 206, and the FOEM 110.

The CEM 204 is configured to estimate channel impulse response (CIR). The CIR may be understood as channel coefficients that help in determining characteristics of the channel when the channel is considered as a filter. The CIR of the channel is thus used to undo the distortions caused by the channel and recover an estimated signal, which is substantially similar to the originally transmitted signals. The CIR, as will be known to a person skilled in the art, may be estimated using various methods that have not been explained here for the sake of brevity. In one implementation, the CIR may be estimated using a training sequence present in the received signal 108. The training sequence, as will be apparent to a person skilled in the art, may be provided in the transmitted signal corresponding to the received signal 108 and may be used as a timing reference and for equalization of the received signal 108.

The CEM 204 then provides the CIR, represented as h(k), in the figure to the EDM 206 and the SRM 208. In one implementation, the EDM 206 is configured to equalize and demodulate the received signal 108 using the CIR and the received signal r(n) to obtain equalized symbols. In one implementation, the EDM 206 may be configured to convert the equalized symbols derived in the form of soft bits into hard bits. The soft bits may be understood as a representation of the data corresponding to the equalized symbols in the form of a value representing the symbol along with a reliability indicator. The hard bits on the other hand may be understood as a representation of the data corresponding to the equalized symbols in the form of only a value representing the symbol. Converting the soft bits into hard bits facilitates easier processing of data bits present in the equalized symbols. In another implementation, the soft bits may be used as the equalized symbols. The equalized symbols thus produced are still digitally modulated and are subsequently demodulated to obtain demodulated symbols.

The EDM 206 subsequently provides the demodulated symbols to the SRM 208 for generating a reconstructed signal. In one implementation, the SRM 208 is configured to generate a reconstructed signal c(n) for the received signal r(n) based on the demodulated symbols. The reconstructed signal c(n) may alternatively be based on the channel estimation h(k) and one or more of the equalized symbols, the training sequence, and other known symbols. In one implementation, the reconstructed signal c(n) is generated for the received signal r(n) as a convolution of the demodulated symbols and the CIR corresponding to the received signal r(n). The SRM 208 thus generates the reconstructed signal c(n) using the following formula:

$$c(n) = s(n) * h(k) \quad (2)$$

where h(k) is the CR corresponding to the received signal r(n); s(n) are the demodulated symbols; and * denotes a convolution operation.

In another implementation, the reconstructed signal may be generated using the equalized symbols and the CIR. In yet another implementation, the training sequence or the known symbols may be used for generation of the reconstructed signal together with the CIR.

Further, in case the received signal r(n) is a multi-branch signal, the SRM 208 generates the reconstructed signal c(n) as a reconstruction matrix of a plurality of reconstructed signal branches. In one implementation, the plurality of reconstructed signal branch includes, for each signal branch of the received signal r(n), a corresponding reconstructed signal branch. In one implementation, the SRM 208 generates the reconstructed signal for each signal branch using the following equation:

$$c^m(n) = s(n) * h^m(k) \quad (3)$$

where $h^m(k)$ is the CIR corresponding to the $m^{th}$ signal branch of the received signal, say $r^m(n)$; s(n) are the equalized symbols; and $c^m(n)$ is the reconstructed signal branch corresponding to the $m^{th}$ signal branch. The reconstructed signal c(n) in such a case is determined as a reconstruction matrix of the reconstructed signal branch using the following representation:

$$c(n) = \begin{bmatrix} c^1(n) \\ \vdots \\ c^M(n) \end{bmatrix} \quad (4)$$

where c(n) is the reconstructed signal at time instant 'n' and $c^1(n), c^2(n), \ldots, c^M(n)$ are reconstructed symbols of the corresponding branches at the time instant 'n'. Therefore for a time instant 'n', c(n) is a column vector of length M.

The SRM 208 subsequently provides the reconstructed signal c(n) to the FOEM 110. The FOEM 110 is configured to estimate the frequency offset α based on the received signal r(n) and the reconstructed signal c(n). As previously mentioned, the FOEM 110 uses the technique of normalized-correlation to estimate the frequency offset α. In one implementation, the FOEM 110 computes the frequency offset α such that the frequency offset α is the value at which normalized-correlation between the reconstructed signal c(n) and the received signal r(n) is maximum. The frequency offset α may thus be represented using the following equation:

$$\alpha = \underset{\alpha}{\operatorname{argmax}} \langle c, r_\alpha \rangle \quad (5)$$

where $\langle c, r_\alpha \rangle$ is the normalized-correlation function of the reconstructed signal c(n) and a modeled received signal $r_\alpha(n)$. The modeled received signal $r_\alpha(n)$ may be considered as a signal modeled from the received signal r(n). The modeled received signal $r_\alpha(n)$, interchangeably referred to as the received signal $r_\alpha(n)$, may be represented as follows:

$$r_\alpha(n) = e^{-jn\alpha s} r(n) \tag{6}$$

In one implementation, the FOEM 110 includes a normalized-correlation computation module (NCCM) 210 configured to compute the maximum normalized-correlation for the received signal $r_\alpha(n)$ and the reconstructed signal c(n). In one implementation, the NCCM 210 determines the normalized-correlation function $\langle c, r_\alpha \rangle$ using the following formula:

$$\langle c, r_\alpha \rangle = \Sigma_n \{[c(n)]^H Q^{-1}[r_\alpha(n)]\} \tag{7}$$

where $[c(n)]^H$ is Hermitian transpose of the reconstructed signal c(n) and $Q^{-1}$ is an inverse of a normalization matrix Q.

In one implementation, the FOEM 110 includes a normalization matrix determination module (NMDM) 212 configured to determine the normalization matrix Q. The NMDM 212 may be implemented as, signal processor(s), state machines, logic circuitries, microprocessor(s), microcontroller(s), and/or any devices or components that manipulate signals based on operational instructions. As previously described, the normalization matrix may be for example, a covariance matrix, a whitening filter, and an inverse matrix. In one embodiment, the NMDM 212 is configured to determine the normalization matrix based on the reconstructed signal using the following formula:

$$Q = \Sigma_n \{[c(n)][c(n)]^H\} \tag{8}$$

In other embodiment, the normalization matrix may be a pre-computed matrix, for example, an identity matrix stored in the memory associated with the communication device 102. The NMDM 212 in such a case may be configured to obtain the normalization matrix from the memory. The NMDM 212 subsequently determines an inverse matrix $Q^{-1}$ for the normalization matrix Q. The inverse matrix $Q^{-1}$ thus determined is provided by the NMDM 212 to the NCCM 210 for computing the maximum normalized-correlation for the received signal $r_\alpha(n)$ and the reconstructed signal c(n).

In one embodiment, the NCCM 210 may compute the frequency offset α using a set of predetermined hypothetical frequency offsets. $A = \{\alpha_0, \alpha_1, \ldots, \alpha_K\}$. The NCCM 210 may be configured to initially determine a set of predetermined hypothetical frequency offsets $A = \{\alpha_0, \alpha_1, \ldots, \alpha_K\}$. The NCCM 210 then generates a rotated signal $r_\beta(n)$ for each of the frequency offsets from the set of predetermined hypothetical frequency offsets by rotating the received signal r(n) by each of the predetermined hypothetical frequency offsets A. The rotated signal $r_\beta(n)$ is then used by the NCCM 210 to compute a normalized-correlation $\langle c, r_\beta \rangle$ for each of the predetermined hypothetical frequency offsets using the equations (7) and (8) mentioned above. The predetermined hypothetical frequency offset that yields the maximum normalized-correlation may then be determined by the NCCM 210 and chosen as the frequency offset α.

In another embodiment, the NCCM 210 uses an analytical method to determine a closed-form expression for computing the frequency offset α. The analytical method is based on an approximation of the modeled received signal as a Taylor expansion having the frequency offset as argument. A detailed derivation of formulas used in the analytical method for estimating the frequency offset α is provided below. The derivation of the formulas is exemplary and it will be understood to those skilled in the art that equivalent formulations with minor variations of the formulas presented herein may be used in accordance with the embodiments described herein.

Initially, in order to obtain the frequency offset at which correlation is maximum, the normalized-correlation function of the equation (5) is differentiated as follows:

$$\frac{\partial}{\partial \alpha} \langle c, r_\alpha \rangle = 0 \tag{9}$$

The equation (9) may then be simplified by substituting the value of the normalized-correlation function $\langle c, r_\alpha \rangle$ using the equation (7) to obtain the following:

$$\sum_n \left\{ [c(n)]^H Q^{-1} \frac{\partial}{\partial \alpha} r_\alpha(n) \right\} = 0 \tag{10}$$

The value of $r_\alpha(n)$ may be subsequently substituted in the equation (10) using the equation (6). However, in order for simplification, initially an approximation of a polynomial expansion for the received signal $r_\alpha(n)$ may be defined. The approximated polynomial expansion of the received signal $r_\alpha(n)$ may be then used for efficiently estimating the frequency offset α. In one implementation, the polynomial expansion may be approximated using Taylor series as follows:

$$r_\alpha \cong \left[ 1 - jn\alpha - \frac{n^2}{2}\alpha^2 \right] r(n) \tag{11}$$

A simplification of the equation (9) may then be defined using the equations (10) and (11) as follows:

$$\sum_n \left\{ [c(n)]^H Q^{-1} \frac{\partial}{\partial \alpha} \left[ 1 - jn\alpha - \frac{n^2}{2}\alpha^2 \right] r(n) \right\} = 0 \tag{12}$$

From the equation (12) it may be derived that an estimate of the frequency offset α may be computed using the following equation:

$$\hat{\alpha} = \text{Re} \left\{ \sum_n \left\{ \frac{[c(n)]^H Q^{-1} [-jnr(n)]}{[c(n)]^H Q^{-1} [n^2 r(n)]} \right\} \right\} \tag{13}$$

where $\hat{\alpha}$ is an estimate of the frequency offset α and Re{ } is real part of the solution obtained on simplification of the equation 13.

The equation (13) thus obtained may be used by the NCCM 210 to compute the frequency offset α. For the purpose, the NCCM 210 substitutes the values of c(n) and $Q^{-1}$ using the equations (4) and (8) in the equation (13). The frequency offset α thus computed may be used to correct the frequency offset α, for example, by adjusting the reference frequency used by the oscillators of the communication device 102. Correction of the frequency offset thus computed will be explained with greater details in the FIGS. 3(*a*), 3(*b*), 4(*a*), and 4(*b*). The system for estimation of the frequency offset α as described herein may be effectively used for frequency estimation of circular Gaussian signals, such as VAMOS signals for which the conventional techniques fail at certain conditions, for example, when SCPIR is equal to 0 dB for the VAMOS signals.

Although estimation of the frequency offset by the FOEM 110 is explained here with reference to the analytical method and the set of predetermined hypothetical frequency offsets, it would be apparent that equivalent formulas or methods may also be used to compute the frequency offset corresponding to maximum normalized-correlation for the received signal r(n) and the reconstructed signal c(n) without deviating from the scope of the present subject matter.

Figure 3A:
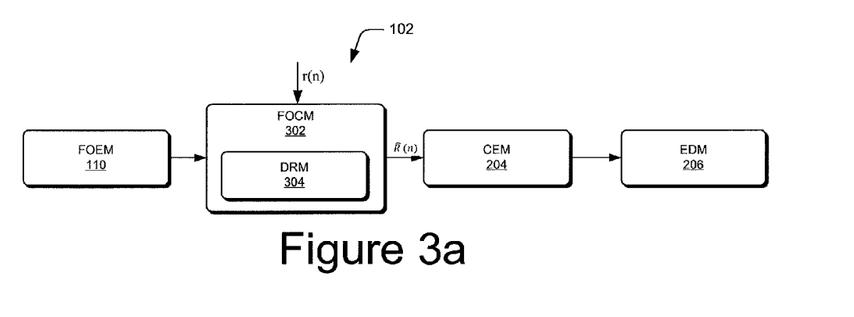
FIGS. 3a and 3b illustrate the communication device implementing a system for frequency offset correction based on the estimated frequency offset, according to an embodiment of the present subject matter.
Figure 3B:
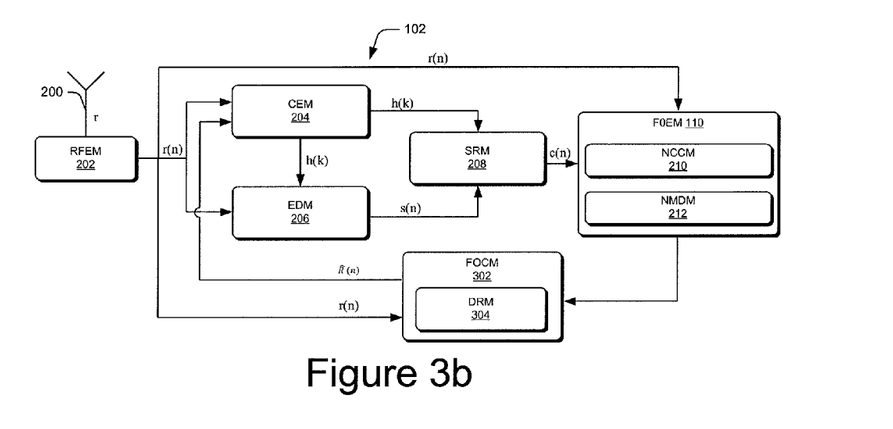

FIG. 3a illustrates the communication device 102 implementing a system for frequency offset correction based on the estimated frequency offset α, according to an embodiment of the present subject matter. FIG. 3b shows a feedback loop illustrating the implementation of the system for frequency offset correction illustrated in the FIG. 3a.

In one implementation, the communication device 102 includes a frequency offset correction module (FOCM) 302 configured to correct the frequency offset α between the carrier frequency of the received signal 108 and the reference signal used by the communication devices 102. The FOCM 302 initially receives the frequency offset α estimated by the FOEM 110. As previously described, the FOEM 110 is configured to estimate the frequency offset α based on normalized-correlation. The frequency offset α thus estimated by the FOEM 110 is provided to the FOCM 302. The FOCM 302, in said embodiment includes a de-rotation module (DRM) 304 configured to de-rotate the received signal r(n) by the frequency offset α to generate a de-rotated signal $\hat{R}(n)$. The de-rotated signal $\hat{R}(n)$ is ideally a frequency-offset free signal and may be used for re-estimating the equalized symbols and demodulation in order to obtain an estimate of the data bits transmitted in the original transmitted signal.

In one implementation, the FOCM 302 provides the de-rotated signal $\hat{R}(n)$ to the CEM 204. The CEM 204, based on the de-rotated signal $\hat{R}(n)$, re-estimates the CIR and provides the re-estimated CIR to the EDM 206. The EDM 206, in turn re-estimates the equalized symbols based on the re-estimated CIR to obtain re-equalized symbols. The re-equalized symbols are then used by the EDM 206 to obtain re-demodulated symbols in order to obtain the estimate of the data bits transmitted in the original transmitted signal. The FOEM 110, the FOCM 302, the CEM 204, and the EDM 206, are thus connected in the form of an iteration or a feedback loop, as shown in FIG. 3b, to correct the frequency offset α and thus improve the performance of the communication device 102. Further, in one embodiment, the estimated frequency offset α may be used to correct frequency offset in subsequent received signals. For instance, a subsequent received signal may be provided to the DRM 304 for generating the de-rotated signal $\hat{R}(n)$. The de-rotated signal $\hat{R}(n)$ may be further processed for estimating subsequent CIR, subsequent equalized symbols, and subsequent demodulated signal corresponding to the subsequent received signal.

Figure 4A:
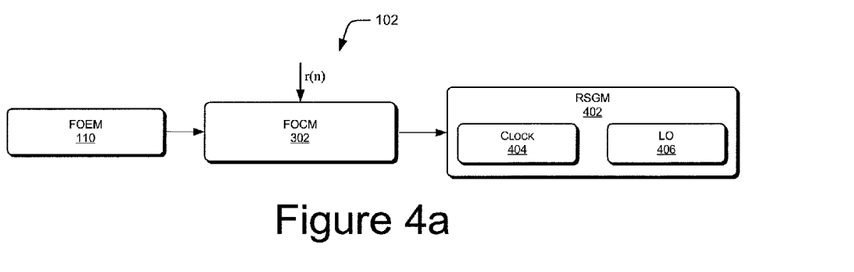
FIGS. 4a and 4b illustrate the communication device implementing a system for frequency offset correction based on the estimated frequency offset, according to another embodiment of the present subject matter.
Figure 4B:
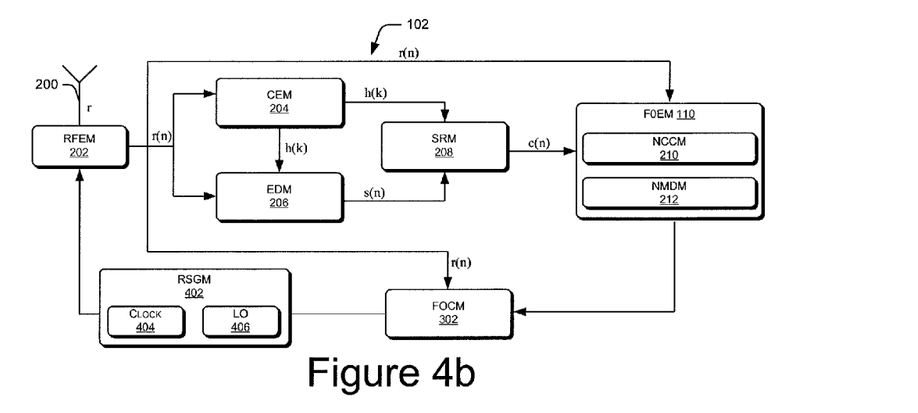

FIG. 4a illustrates the communication device 102 implementing a system for frequency offset correction based on the estimated frequency offset α, according to another embodiment of the present subject matter. FIG. 4b shows a feedback loop illustrating the implementation of the system for frequency offset correction illustrated in the FIG. 4a.

The communication device 102, as described previously, includes the FOCM 302 configured to correct the frequency offset α between the carrier frequency of the received signal 108 and the reference signal used by the communication devices 102. The communication device 102, further includes a reference signal generation module (RSGM) 402 connected to the FOCM 302 and the RFEM 202, as illustrated in the FIG. 4b. The RSGM 402, as will be understood, is configured to provide the reference signal used by the RFEM 202 to down-convert the received signal 108. For the purpose, the RSGM 402 includes clock 404, configured to act as a reference clock for providing timing references in the communication device 102, and a local oscillator (LO) 406 configured to generate the reference signal based on the timing references provide by the clock 404. The LO 406 may be any oscillator used for generating signal, for example, a crystal oscillator. Although the RSGM 402 has been shown external to the RFEM 202, it would be obvious to a person skilled in the art, that the RSGM 402 may be internal to the RFEM 202.

The FOCM 302, in said embodiment is configured to correct the frequency offset α by adjusting the clock 404. The FOCM 302 initially receives the frequency offset α estimated by the FOEM 110. Based on the frequency offset α, the FOCM 302 determines the appropriate frequency at which the reference signals need to be generated and adjusts the clock 404 to generate clock signals in accordance with the appropriate frequency. Corrected clock signals thus generated by the clock 404 are provided to the LO 406 which generates a corrected reference signals based on the corrected clock signals. The corrected reference frequency may then be provided to the RFEM 202 for down-converting the subsequent received signals. The FOEM 110, the FOCM 302, the RSGM 402, and the RFEM 202, are thus connected in the form of a feedback loop to correct the frequency offset α and thus improve the performance of the communication device 102.

Thus the communication device 102 may be configured to correct the frequency offset based on the estimated frequency offset α by either the equalized symbols and demodulation using the de-rotated received signal or correcting the reference frequency generated by the LO 406. Additionally, in one embodiment, the communication device 102 may be configured to correct the frequency offset α using a combination of re-estimating the equalized symbols and correction of the reference frequency generated by the LO 406. In said embodiment, the communication device 102 may re-estimate the equalized symbols and the demodulated symbols based on de-rotation of a received signal down-converted using the corrected reference frequency generated by the LO 406. Re-estimating the equalized symbols and the demodulated symbols based on a received generated using the corrected reference frequency facilitates in improving the performance of the communication device 102.

Figure 5:
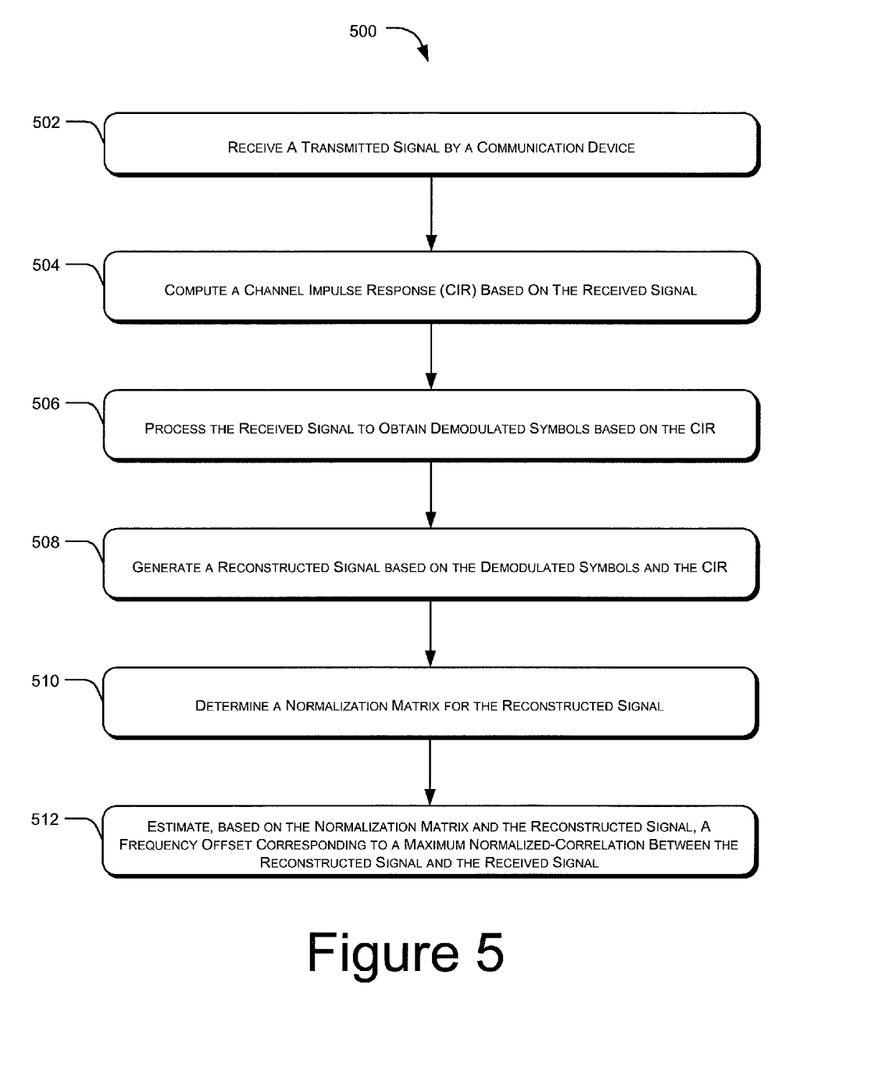
FIG. 5 illustrates a method of estimating frequency offset in a communication device, according to an embodiment of the present subject matter.

FIG. 5 illustrates a method of estimating frequency offset in a communication device, such as the communication device 102, in accordance with an embodiment of the present subject matter. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media such as magnetic disks and magnetic tapes, hard drives, or optically readable digital data storage media.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 502, an originally transmitted signal is received as a received signal, such as the received signal 108 by a communication device, such as the communication device 102. The received signal 108 is seldom identical to the originally transmitted signal, as the originally transmitted signal suffers from various impairments, such as frequency variations due to Doppler spread. Additionally, the received signal 108 is also subjected to frequency variations caused due to the operation of various components, such as clock circuits, and oscillators of the receiving device, i.e., the communication device 102. The frequency variations thus introduced result in a frequency offset between the carrier frequency of the received signal 108 and a reference signal used by the communication device 102, to recover an estimated signal similar to the originally transmitted signal, thus affecting the estimation of the originally transmitted signal.

At block 504, a channel impulse response (CIR) of a channel used to transmit the originally transmitted signal is determined based on the received signal. In one implementation, the CIR may be estimated, for example, by the CEM 204, using a training sequence present in the received signal 108. The training sequence, as will be apparent to a person skilled in the art, is provided in each of the received signal and is used as a timing reference and for equalization of the received signal.

At block 506, the received signal is processed to obtain demodulated symbols corresponding to the received signal, for example, by the EDM 206. In one embodiment, the received signal 108 is initially equalized based on the CIR and the received signal to obtain equalized symbols. The equalized symbols are subsequently demodulated to obtain demodulated symbols having data signal bits transmitted in the originally transmitted signal. In one implementation, the training sequence present in the received signal 108 may be used as the equalized symbols.

At block 508, a reconstructed signal c(n) is generated based on the demodulated symbols and the CIR, for example, by the SRM 208. In one implementation, the reconstructed signal c(n) is generated for a multi-branch received signal r(n) as a reconstruction matrix of signals reconstructed for each branch of the received signal r(n). In another implementation, the reconstructed signal $c^m(n)$ for each signal branch is generated using the formula given in the equation (3). Further, the reconstructed signal c(n), corresponding to the received signal r(n), in such a case is determined as the reconstruction matrix using the formula given in the equation (4). Additionally, reconstructed signal c(n) may be generated based on the CIR along with any one of the equalized symbols, the training sequence, and the known symbols.

At block 510, a normalization matrix is determined for the reconstructed signal, for example, by the NMDM 212. In one implementation, a normalization matrix Q is initially determined in order to estimate the frequency offset $\alpha$. In one embodiment, the normalization matrix may be computed based on the formula illustrated using equation (8), reproduced below for convenience.

$$Q=\Sigma_n\{[c(n)][c(n)]^H\} \quad (8)$$

In other embodiment, the normalization matrix may be a pre-computed matrix, for example, an identity matrix stored in a memory associated with the communication device 102.

At block 512, a frequency offset corresponding to a maximum-normalized correlation between the reconstructed signal and the received signal is computed based on the normalization matrix and the reconstructed matrix. In one embodiment, a normalized-correlation function $\langle c, r_\alpha \rangle$ of the reconstructed signal c(n) and a modeled received signal $r_\alpha(n)$ is defined for computing the maximum normalized-correlation. The modeled received signal $r_\alpha(n)$, hereinafter referred to as the received signal $r_\alpha(n)$, may be considered as a signal modeled from the received signal r(n) as represented by the equation (6).

The received signal $r_\alpha(n)$ and the reconstructed signal c(n) are then used to compute the frequency offset $\alpha$ as the value at which normalized-correlation between the reconstructed signal c(n) and the received signal $r_\alpha(n)$ is maximum. The frequency offset $\alpha$ is thus computed using the formula given in equation (5).

Further, the normalized-correlation for the reconstructed signal c(n) and the received signal $r_\alpha(n)$ is represented using the equation (7), reproduced below for convenience.

$$\langle c, r_\alpha \rangle = \Sigma_n\{[c(n)]^H Q^{-1}[r_\alpha(n)]\} \quad (7)$$

In one embodiment, the frequency offset $\alpha$ is computed, for example, by the NCCM 210 using a set of predetermined hypothetical frequency offsets. $A=\{\alpha_0, \alpha_1, \ldots, \alpha_K\}$. Each of predetermined hypothetical frequency offsets is used to rotate the received signal r(n) to generate a rotated signal $r_\beta(n)$ corresponding to each of the predetermined hypothetical frequency offsets A. The rotated signal $r_\beta(n)$ is then used to compute a normalized-correlation $\langle c, r_\beta \rangle$ for each of the predetermined hypothetical frequency offsets using the equations (8) and (7). The predetermined hypothetical frequency offset that yields the maximum normalized-correlation may then be chosen as the frequency offset $\alpha$.

In another embodiment, an analytical method, based on an approximation of the modeled received signal as a Taylor expansion having the frequency offset $\alpha$ as argument, is used for example, by the NCCM 210 to determine the frequency offset $\alpha$. Further, a function based on the computation of the Taylor expansion, an inverse of the normalization matrix, a Hermitian transpose of the reconstructed signal, and the received signal is estimated to determine the frequency offset $\alpha$ The frequency offset $\alpha$ thus determined may then be used to correct the frequency offset in the communication device 102.

Figure 6:
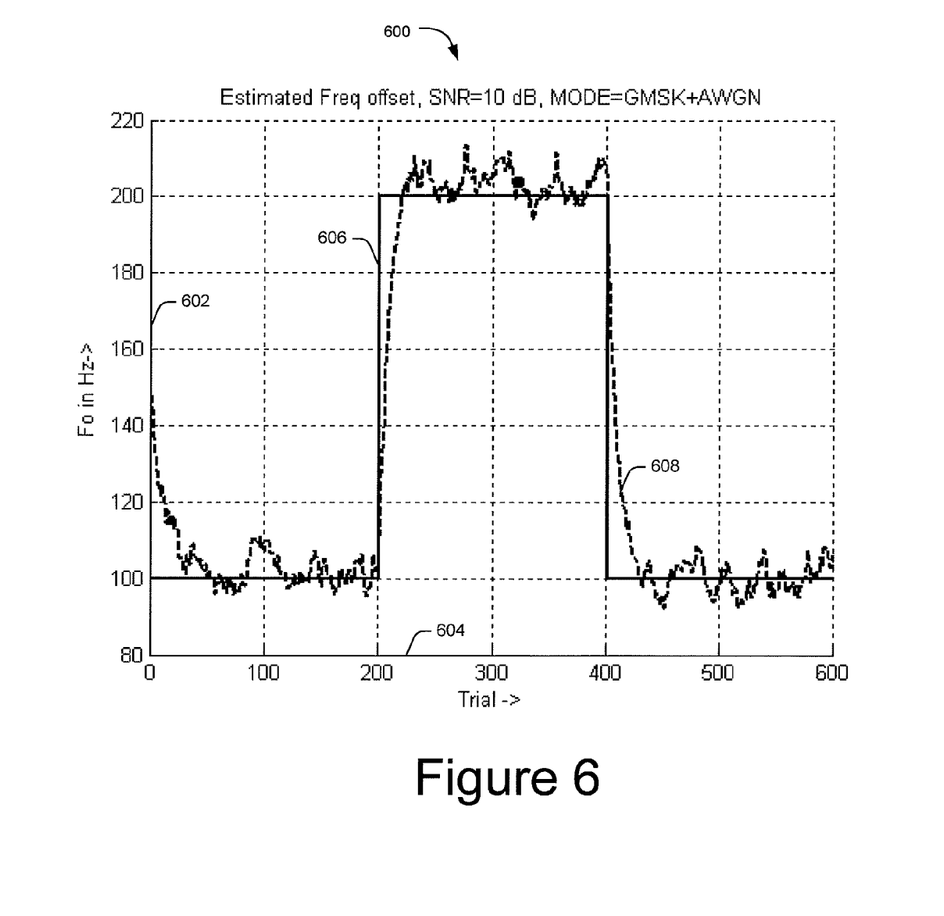
FIG. 6 illustrates a graph depicting frequency offset estimated for a Gaussian minimum shift keying signal at 10 dB signal noise ratio (SNR), according to an embodiment of the present subject matter.

FIG. 6 illustrates a graph 600 depicting frequency offset estimated for a Gaussian minimum shift keying (GMSK) signal at 10 dB signal noise ratio (SNR), according to an embodiment of the present subject matter. The graph 600 further depicts a comparison of estimated frequency offset between the frequency offset estimated using the present subject matter and the frequency offset induced in the communication device used for testing the present method and systems of estimating frequency offset. In the graph 600, the estimated frequency offset, in hertz (Hz), is represented along a vertical axis 602, while sequence of received signal bursts is represented on a horizontal axis 604.

Curve 606 represents the frequency offset induced in the communication device and is taken as a reference to compare accuracy of the frequency offset estimated using the present subject matter. Curve 608 represents frequency offset estimated using the present subject matter.

The graph 600 thus illustrates that the method 500, as implemented in the communication device 102, accurately estimates the frequency offset near to the correct frequency offset. Further, the method 500 efficiently estimates the frequency offset for signals modulated using GMSK and other similar schemes.

Figure 7:
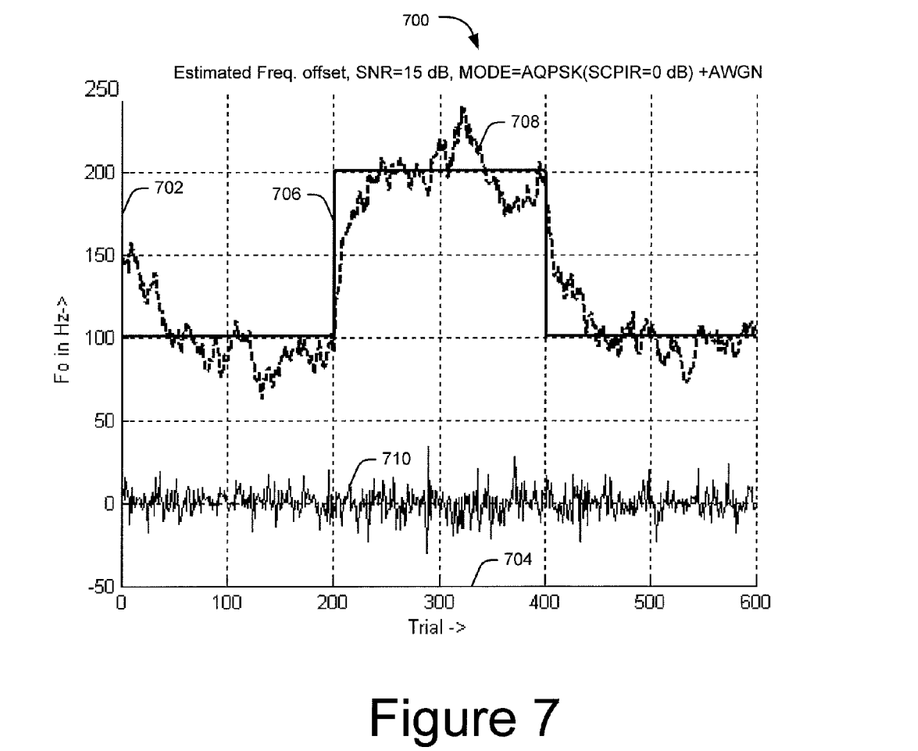
FIG. 7 illustrates a graph depicting frequency offset estimated for an Asynchronous Quadrature Phase Shift Keying (AQPSK) signal with (SCPIR=0 dB) at 15 dB signal noise ratio (SNR), according to an embodiment of the present subject matter and a comparison thereof when the frequency offset is estimated using conventional methods and systems.

FIG. 7 illustrates a graph 700 depicting frequency offset estimated for an AQPSK signal with (SCPIR=0 dB) at 15 dB signal noise ratio (SNR), according to an embodiment of the present subject matter. The graph 700 further depicts a comparison of an estimated frequency offset when the frequency offset is estimated using the present subject matter and conventional methods and systems. In the graph 700, the estimated frequency offset, in hertz (Hz), is represented along a vertical axis 702, while sequence of received signal bursts is represented on a horizontal axis 704.

Curve 706 represents the frequency offset induced in the communication device 102 and is taken as a reference to compare accuracy of the frequency offset estimated using the present subject matter and the conventional methods. Curve 708 represents frequency offset estimated using the present subject matter. Curve 710 indicates the frequency offset estimated using the conventional methods and systems.

The graph 700 thus illustrates that the method 500, as implemented in the communication device 102, accurately estimates the frequency offset closer to the correct frequency offset. Further, the method 500 efficiently estimates the frequency offset for circular Gaussian signals, whereas the conventional method fails to estimate the frequency offset for the circular Gaussian signals.

Although implementations for estimation of frequency offset in a communication device have been described in language specific to structural features and/or methods, it is to be understood that the appended claims are not necessarily limited to the specific features or methods described. Rather, the specific features and methods are disclosed as specimen implementations for estimation the frequency offset.

We claim:

1. A method of estimating a frequency offset in a communication device, the method comprising:
generating a reconstructed signal based at least in part on a channel impulse response (CIR) corresponding to a received signal;
determining a normalization matrix for the reconstructed signal; and
estimating the frequency offset based at least in part on the normalization matrix and the reconstructed signal, wherein the frequency offset corresponds to a maximum normalized-correlation between the reconstructed signal and the received signal, wherein the normalization matrix is at least one of an identity matrix, a covariance matrix, a whitening filter, and an inverse matrix.

2. The method as claimed in claim 1, wherein generating the reconstructed signal comprises:
computing the CIR for the received signal; and
generating the reconstructed signal based on the CIR and known symbols.

3. The method as claimed in claim 1, wherein generating the reconstructed signal comprises:
computing the CIR for the received signal;
processing, based on the CIR, the received signal to obtain demodulated symbols; and
generating the reconstructed signal based on the CIR and the demodulated symbols.

4. The method as claimed in claim 3, wherein the processing comprises:
equalizing the received signal to obtain equalized symbols based on the CIR; and
demodulating the equalized symbols to obtain the demodulated symbols.

5. The method as claimed in claim 1, wherein generating the reconstructed signal comprises:
computing the CIR for the received signal; and
generating the reconstructed signal based on the CIR and equalized symbols obtained by equalizing the received signal.

6. The method as claimed in claim 1, wherein estimating the frequency offset comprises:
determining a set of predetermined hypothetical frequency offsets;
rotating the received signal by each of the predetermined hypothetical frequency offsets to obtain rotated signals corresponding to each of the predetermined hypothetical frequency offsets;
calculating, for each of the predetermined hypothetical frequency offsets, a normalized-correlation between the reconstructed signal and the rotated signal based on the normalization matrix; and
selecting, as the frequency offset, the predetermined hypothetical frequency offset that yields the maximum normalized-correlation.

7. The method as claimed in claim 1, wherein estimating the frequency offset comprises computing the frequency offset based on an approximation of a modeled received signal as a Taylor expansion having the frequency offset as argument, wherein the modeled received signal is a signal modeled from the received signal.

8. The method as claimed in claim 7, wherein estimating the frequency offset based on the computation of the Taylor expansion comprises determining a function of an inverse of the normalization matrix, a Hermitian transpose of the reconstructed signal, and the received signal.

9. The method as claimed in claim 1, wherein, for the received signal being a multi-branch signal, generating the reconstructed signal comprises:
computing for each signal branch of the multi-branch signal a corresponding reconstructed signal branch; and
constructing a reconstruction matrix based on a plurality of reconstructed signal branches.

10. The method as claimed in claim 1, further comprising:
de-rotating the received signal based on the frequency offset to obtain a de-rotated received signal;
estimating the de-rotated received signal to obtain a re-estimated CIR;
equalizing the de-rotated received signal to obtain re-equalized symbols based on the re-estimated CIR; and
demodulating the re-equalized symbols to obtain the re-demodulated symbols.

11. The method as claimed in claim 1, further comprising:
de-rotating a subsequent received signal based on the frequency offset to obtain a de-rotated received signal;
estimating the de-rotated received signal to obtain a subsequent CIR;
corresponding to the subsequent received signal;
equalizing the de-rotated received signal to obtain subsequent equalized symbols based on the subsequent CIR; and
demodulating the subsequent equalized symbols to obtain subsequent demodulated symbols.

12. The method as claimed in claim 1, further comprising:
adjusting, based on the frequency offset, a reference clock to generate corrected clock signals;
generating a corrected reference signal based on the corrected clock signals; and
down-converting subsequent received signals based on the corrected reference signal.

13. A computer program product comprising a non-transitory computer readable medium, having thereon a computer program comprising program instructions, the computer program being loadable into a data-processing unit and adapted to cause execution of the method according to claim 1 when the computer program is run by the data-processing unit.

14. A device comprising:
a signal reconstruction module configured to generate a reconstructed signal based at least in part on a channel impulse response corresponding to a received signal; and
a frequency offset estimation module configured to estimate a frequency offset based at least in part on a normalization matrix and the reconstructed signal, wherein the frequency offset corresponds to a maximum normalized-correlation between the reconstructed signal and the received signal, wherein the normalization matrix is at least one of an identity matrix, a covariance matrix, a whitening filter, and an inverse matrix.

15. The device as claimed in claim 14, further comprising a channel estimation module configured to estimate the CIR.

16. The device as claimed in claim 14, further comprising an equalization and demodulation module configured to:
   equalize, based on the CIR, the received signal to obtain equalized symbols; and
   demodulate the equalized symbols to obtain demodulated symbols.

17. The device as claimed in claim 14, wherein the signal reconstruction module is configured to:
   compute, for the received signal being a multi-branch signal, a reconstructed signal branch corresponding to each signal branch of the multi-branch signal; and
   construct a reconstruction matrix based on a plurality of reconstructed signal branch.

18. The device as claimed in claim 14, wherein the frequency offset estimation module further comprises a normalization matrix determination module configured to determine the normalization matrix.

19. The device as claimed in claim 14, wherein the frequency offset estimation module further comprises a normalized-correlation computation module configured to compute the frequency offset based on an approximation of a modeled received signal as a Taylor expansion having the frequency offset as argument, wherein the modeled received signal is a signal modeled from the received signal.

20. The device as claimed in claim 19, wherein the normalized-correlation computation module is further configured to determine a function based on the computation of the Taylor expansion, an inverse of the normalization matrix, a Hermitian transpose of the reconstructed signal, and the received signal.

21. The device as claimed in claim 14, wherein the frequency offset estimation module further comprises a normalized-correlation computation module configured to:
   determine a set of predetermined hypothetical frequency offsets;
   rotate the received signal by each of the predetermined hypothetical frequency offsets to obtain rotated signals corresponding to each of the predetermined hypothetical frequency offsets;
   calculate, for each of the predetermined hypothetical frequency offsets, a normalized-correlation between the reconstructed signal and the rotated signals; and
   select, as the frequency offset, the predetermined hypothetical frequency offset that yields the maximum normalized-correlation.

22. The device as claimed in claim 14, wherein the device further comprises a de-rotation module configured to,
   de-rotate the received signal based on the frequency offset to obtain a de-rotated received signal, wherein the de-rotated received signal is a frequency-offset free signal; and
   provide the de-rotated received signal to a channel estimation module to obtain a re-estimated CIR for re-processing of the received signal.

23. The device as claimed in claim 14, wherein the device further comprises a de-rotation module configured to,
   de-rotate a subsequent received signal based on the frequency offset to obtain a de-rotated received signal, wherein the de-rotated received signal is a frequency-offset free signal; and
   provide the de-rotated received signal to a channel estimation module to obtain a subsequent estimated CIR for processing of the subsequent received signal.

24. The device as claimed in claim 14, wherein the device further comprises:
   a frequency offset correction module configured to adjust, based on the frequency offset, a reference clock to generate corrected clock signals;
   a local oscillator configured to generate a corrected reference signal based on the corrected clock signals; and
   a receiver front-end module configured to down-convert subsequent received signals based on the corrected reference signal.

* * * * *